United States Patent
Kazi et al.

(10) Patent No.: US 12,351,016 B2
(45) Date of Patent: Jul. 8, 2025

(54) MOUNTING BRACKETS FOR MOWER FUEL TANK

(71) Applicant: DEERE & COMPANY, Moline, IL (US)

(72) Inventors: Mohseen V. Kazi, Pune (IN); Curtis D. Ayers, Willow Spring, NC (US); Ashley T. Moorehead, Holly Springs, NC (US)

(73) Assignee: DEERE & COMPANY, Moline, IL (US)

( * ) Notice: Subject to any disclaimer, the term of this patent is extended or adjusted under 35 U.S.C. 154(b) by 225 days.

(21) Appl. No.: 18/318,903

(22) Filed: May 17, 2023

(65) Prior Publication Data

US 2024/0383328 A1 Nov. 21, 2024

(51) Int. Cl.
*B60K 15/06* (2006.01)
*B60K 15/067* (2006.01)

(52) U.S. Cl.
CPC ....... *B60K 15/067* (2013.01); *B60Y 2200/223* (2013.01)

(58) Field of Classification Search
CPC ............ B60K 15/067; B60K 15/03177; B60Y 2200/223
USPC ............................................ 248/200; 56/10.8
See application file for complete search history.

(56) References Cited

U.S. PATENT DOCUMENTS

| | | | |
|---|---|---|---|
| 6,640,526 B2 * | 11/2003 | Velke | B62D 11/183 56/10.8 |
| 8,172,268 B2 | 5/2012 | Komorida et al. | |
| 9,155,246 B2 * | 10/2015 | Spitz | B60K 15/03177 |
| 9,976,282 B2 | 5/2018 | Voss et al. | |
| 10,986,782 B2 | 4/2021 | Fisher et al. | |
| 11,021,053 B2 | 6/2021 | Bering et al. | |
| 11,299,040 B2 | 4/2022 | Moore | |
| D967,870 S | 10/2022 | Deboer et al. | |
| D974,415 S | 1/2023 | Nelson et al. | |

OTHER PUBLICATIONS

Wright, WSE Fuel Tank Retrofit Kit Replacement Instructions, pp. 1-3.

* cited by examiner

*Primary Examiner* — Todd M Epps

(57) ABSTRACT

A pair of mounting bracket for a mower fuel tank. The bottom bracket and top bracket are attached adjacent a rear traction drive wheel. The bottom bracket has at least one projection extending upwardly into a recess in a bottom surface of a mower fuel tank, and the top bracket has at least one projection extending downwardly into a recess in a top surface of the mower fuel tank. Each projection touches but is not fastened to the corresponding recess, and has a length dimension and a width dimension smaller than the recess to allow relative movement from expansion or contraction of the mower fuel tank

10 Claims, 4 Drawing Sheets

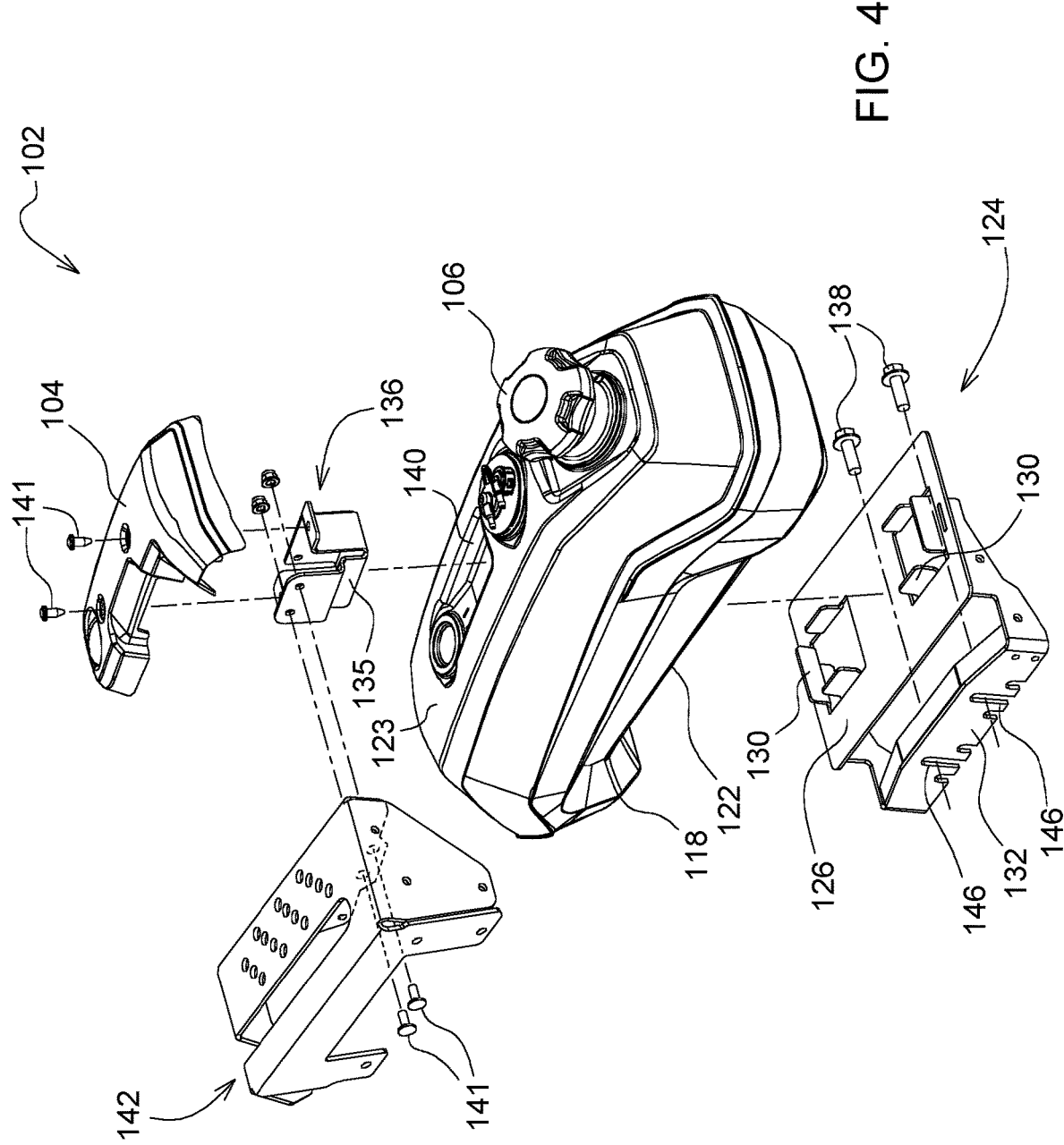

MOUNTING BRACKETS FOR MOWER FUEL TANK

FIELD OF THE INVENTION

This invention relates to mounting brackets for fuel tanks on self propelled grass mowing machines such as stand on mowers.

BACKGROUND OF THE INVENTION

Self propelled grass mowing machines such as stand on mowers may have one or more fuel storage tanks. Mower fuel tanks may be blow molded plastic such as polyethylene, providing a seamless construction that is less vulnerable to stress and cracking. Mower fuel tanks may include an expansion space allowing the fuel to expand with increased temperature, and shrink with decreased temperature. The fuel tank itself may expand and contract with changes in temperature, even if the tank or gas cap is vented.

In the past, some self-propelled grass mowing machines such as stand on mowers have two fuel tanks, with one fuel tank positioned above each rear drive wheel. Straps or wire forms have been wrapped around each mower fuel tank to secure it to the grass mowing machine. After extended use, however, the stress and strain may cause straps or wire forms to loosen or break after repeated tank expansion and contraction. Bolts or other fasteners also may be attached to the walls of mower fuel tanks, but tend to loosen or break from repeated tank expansion and contraction, and also increase the risk of fuel leaks where the bolts or fasteners are attached. Removing and replacing the straps, wire forms, bolts or other fasteners can be a difficult and time intensive task.

There is a need for mounting brackets for mower fuel tanks that do not loosen or break after repeated tank expansion and contraction. There is a need for mounting brackets for mower fuel tanks that are low cost, reduce the risk of fuel tank leaks, and are relatively simple and fast to remove and replace.

SUMMARY OF THE INVENTION

A pair of mounting brackets for mower fuel tanks include a bottom bracket and a top bracket clamping a mower fuel tank therebetween. Each of the pair of brackets have at least one projection extending into a recess in the mower fuel tank, but is not fastened to the fuel tank. Each projection has a smaller length and width dimension than each recess for relative movement due to expansion and contraction. The bottom bracket also may include a horizontal support surface for the mower fuel tank.

BRIEF DESCRIPTION OF THE DRAWINGS

FIG. 4 is an exploded top perspective view of a pair of mounting bracket for a mower fuel tank according to a first embodiment.

DESCRIPTION OF THE PREFERRED EMBODIMENT

Figure 1:
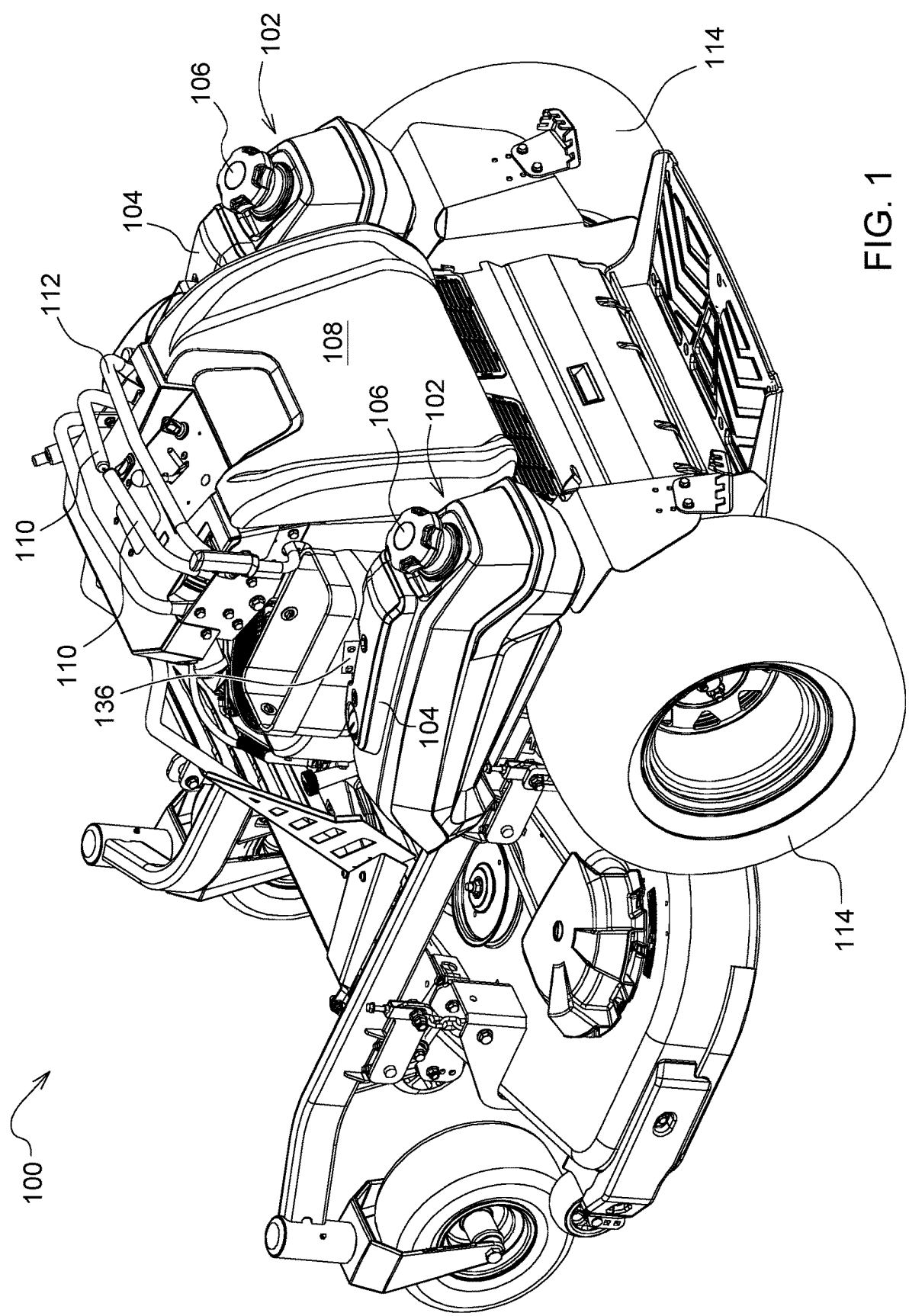
FIG. 1 is a rear perspective view of a stand on mower with a pair of mounting brackets for each of a pair mower fuel tanks according to a first embodiment.
Figure 2:
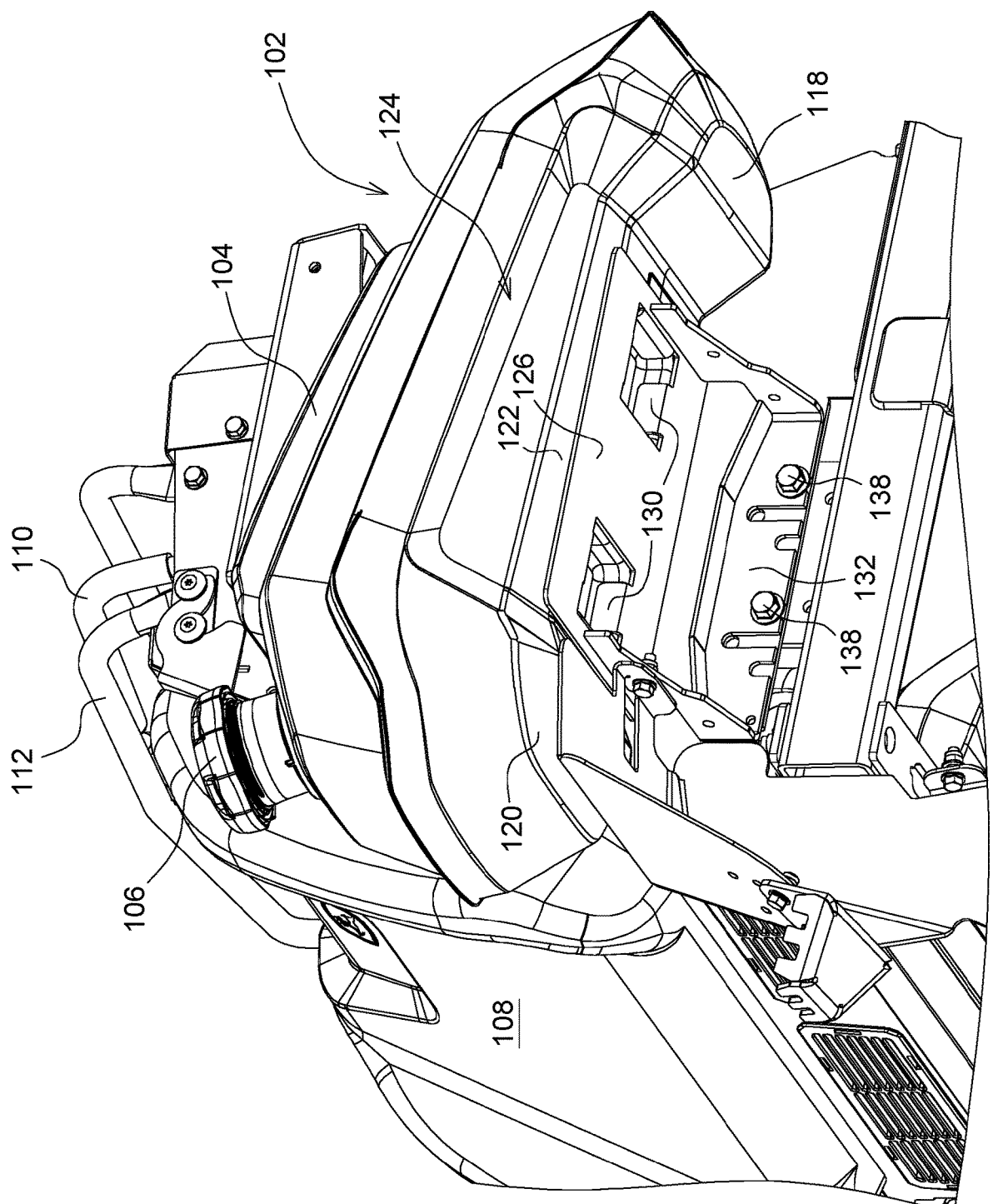
FIG. 2 is a rear perspective view of a pair of mounting brackets for a mower fuel tank according to a first embodiment.
Figure 3:
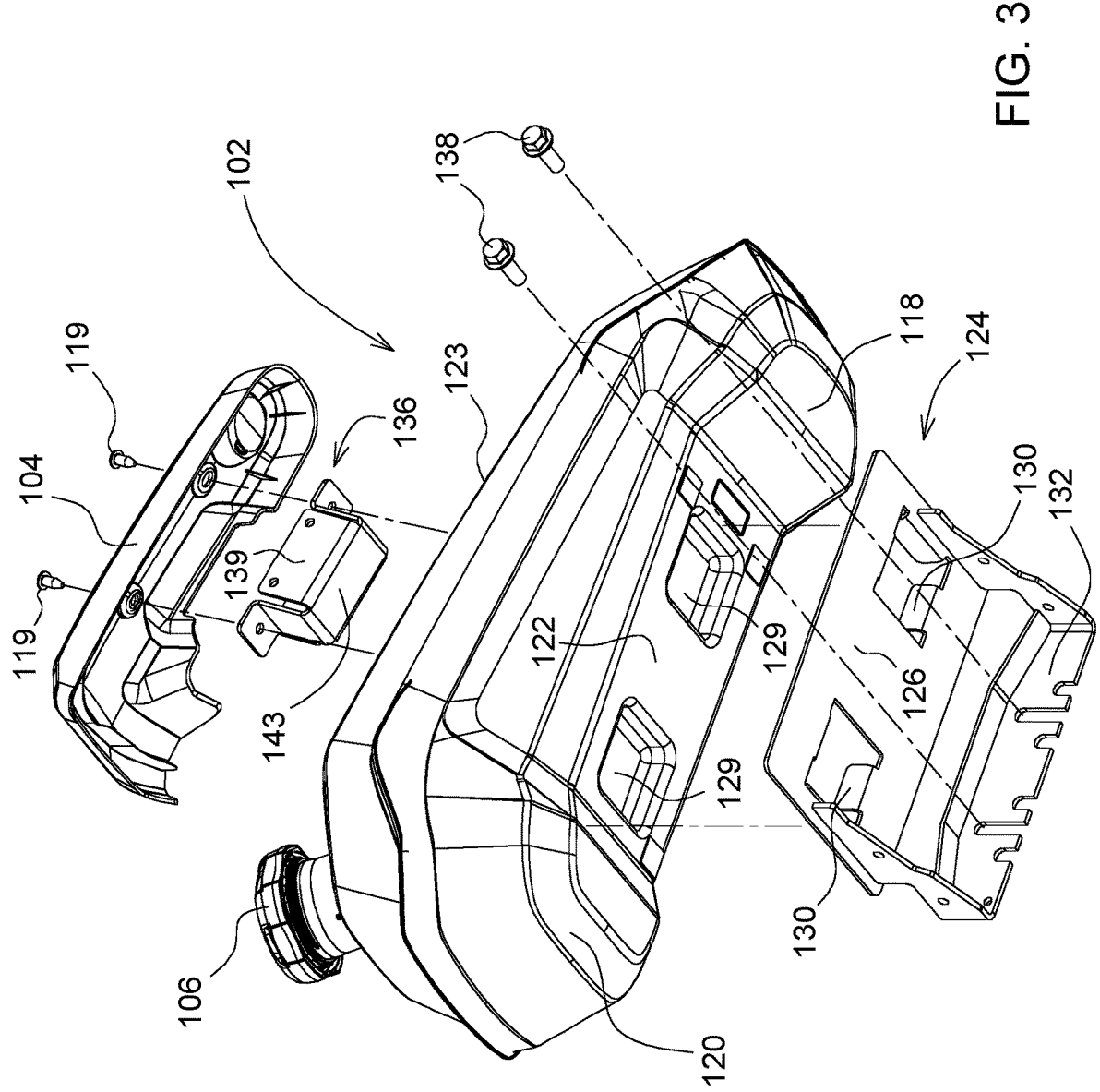
FIG. 3 is an exploded bottom perspective view of pair of mounting bracket for a mower fuel tank according to a first embodiment.

In one embodiment shown in FIGS. 1-4, a self-propelled grass mowing machine such as stand on mower 100 may have one or more fuel tanks 102. For example, a fuel tank may be positioned over each of a pair of rear traction drive wheels 114. Each mower fuel tank may be positioned next to the operator station which may include a pair of control levers 110 for controlling rotation of the rear drive wheels, stationary front reference bar 112 behind the control levers, and leaning pad 108 having a generally upright position.

In one embodiment, each mower fuel tank 102 may be a hollow, blow molded plastic body, with top surface 123 and bottom surface 122. The top and bottom surfaces may be between front end 118 and rear end 120 of the mower fuel tank. The front end and rear end may extend downwardly from the bottom surface. Each mower fuel tank may be interchangeable and may be mounted on either the left side or the right side of the grass mowing machine. A vented fuel cap 106 may be engaged to an opening in top surface 123.

In one embodiment, each mower fuel tank 102 may be mounted with a top bracket 136 and a bottom bracket 124, preferably between top bracket 136 and bottom bracket 124. For example, bottom bracket 124 may be a one piece folded sheet metal bracket. Bottom bracket 124 may be attached to a body member, frame member or other fixed component of the grass mowing machine adjacent a rear traction drive wheel. For example, bottom bracket 124 may be attached with threaded fasteners 138 inserted through vertical slots 146 and engaged to a frame member of the grass mowing machine. The bottom bracket may have several vertical slots 146 for different grass mowing machines and mower fuel tanks. When bottom bracket 124 is attached to the frame, the bottom bracket clamps the mower fuel tank from the bottom. The bottom bracket may limit lateral and longitudinal movement of the mower fuel tank, and can deflect or bend to permit deformation of the tank. The bottom bracket also may include at least one vertically extending projection 130. Each projection 130 may touch or abut feature 129 but is not fastened to the feature. For example, each feature 129 may be a recess in the bottom surface 122 of mower fuel tank 102. For example, bottom bracket 124 may have two upwardly extending projections 130 that touch or abut the two recesses 129. Projections 130 may extend upwardly from surface 126 which may be a generally horizontal supporting shelf under the fuel tank. For example, each projection 130 may have smaller length/width dimensions than the recess, so the mower fuel tank can move relative to the projection, forward and back, and side to side. As a result, bottom bracket 124 is not subjected to high stress and strain as fuel tank 102 expands and contracts.

In one embodiment, each mower fuel tank 102 also may be mounted with top bracket 136. For example, top bracket 136 may be a one piece folded sheet metal bracket. Top bracket 136 may be attached to a body member, frame member or other fixed component of the grass mowing machine adjacent a rear traction drive wheel. For example, top bracket 136 may be attached to height of cut component 142 that is attached to the frame of the grass mowing machine with threaded fasteners 141. When top bracket 136 is attached to the frame, it clamps the mower fuel tank from the top. The top bracket restricts vertical movement of the mower fuel tank, but can deflect or bend to permit deformation of the tank. Additionally, the top bracket also may include at least one generally downwardly extending projection 135, which may touch or abut feature 140 on the top surface 123 of mower fuel tank 102. For example, feature 140 may be a recess in top surface 123. Projection 135 may touch or abut the feature but is not fastened to the feature. For example, projection 135 may have smaller length/width dimensions than the recess, so the mower fuel tank can move relative to the projection, forward and back, or side to side. As a result, top bracket 136 is not subjected to high stress and strain as fuel tank 102 expands and contracts. Optionally, body panel 104 may be attached to top bracket 136 with threaded fasteners 141.

In one embodiment, top brackets 136 are interchangeable for each mower fuel tank 102, and bottom brackets 124 also are interchangeable. The same pair of brackets may be used to mount a mower fuel tank on either the left or right sides of a grass mowing machine.

In one embodiment, a method of mounting each fuel tank to a grass mowing machine such as a stand on mower includes the step of attaching bottom bracket 124 to a body member, frame member or other fixed component of the grass mowing machine adjacent the rear traction drive wheel. Mower fuel tank 102 then may be positioned on a shelf surface 126 of the bottom bracket, and projection 130 extending upwardly from the bottom bracket may be positioned to touch or abut a feature such as recess 129 in the mower fuel tank. Top bracket 136 then may be attaching to a body member, frame member or other fixed component of the grass mowing machine. The downwardly extending projection 135 then may be positioned so that it touches or abuts a feature such as recess 140 in the top of the mower fuel tank. As a result, the mower fuel tank is clamped between the pair of brackets 124, 136 which allow the fuel tank to move as it expands and retracts.

Having described the preferred embodiment, it will become apparent that various modifications can be made without departing from the scope of the invention as defined in the accompanying claims.

The invention claimed is:

1. A pair of mounting brackets for a mower fuel tank, comprising:
   a bottom bracket attached adjacent a rear traction drive wheel, and having at least one projection extending upwardly into a recess in a bottom surface of a mower fuel tank; and
   a top bracket attached adjacent the rear traction drive wheel, and having at least one projection extending downwardly into a recess in a top surface of the mower fuel tank;
   each projection touching but not fastened to the corresponding recess, and having a length dimension and a width dimension smaller than the recess to allow relative movement from expansion or contraction of the mower fuel tank.

2. The pair of mower fuel tank mounting brackets of claim 1 further comprising a plurality of projections extending upwardly from the bottom bracket into a pair of recesses in the bottom surface of the mower fuel tank.

3. The pair of mower fuel tank mounting brackets of claim 1 wherein the bottom bracket includes a horizontal support surface.

4. The pair of mower fuel tank mounting brackets of claim 1 wherein the bottom bracket and the top bracket are interchangeable for mounting a mower fuel tank above a left traction drive wheel or a right traction drive wheel.

5. A mower fuel tank mounting method comprising the steps of:
   attaching a bottom bracket adjacent a rear traction drive wheel of a grass mowing machine;
   positioning a mower fuel tank on a support surface of the bottom bracket;
   positioning a projection extending upwardly from the support surface into a recess in a bottom surface of the mower fuel tank without fastening the projection to the recess;
   attaching a top bracket adjacent the rear traction drive wheel;
   positioning a projection extending downwardly from the support surface into a recess in a top surface of the mower fuel tank without fastening the projection to the recess.

6. The mower fuel tank mounting method of claim 5 further comprising clamping the mower fuel tank between the bottom bracket and the top bracket.

7. The mower fuel tank mounting bracket of claim 5 wherein each of the projections have a smaller length and width than each of the recesses.

8. A pair of mower fuel tank mounting brackets comprising:
   a bottom bracket and a top bracket clamping a mower fuel tank therebetween, each of the pair of brackets having at least one projection extending into a recess in the mower fuel tank; each projection having smaller length and width dimensions than each recess.

9. A mower fuel tank mounting bracket of claim 8 wherein the bottom bracket includes a horizontal support surface for the mower fuel tank.

10. The mower fuel tank mounting bracket of claim 8 further comprising a pair of brackets on each side of a grass mowing machine.

\* \* \* \* \*